United States Patent [19]

Campana

[11] 4,162,179
[45] Jul. 24, 1979

[54] REFRACTORY ARTICLE AND METHOD OF MAKING THE SAME

[76] Inventor: Patsie C. Campana, 2614 Sherwood Dr., Lorain, Ohio 44053

[21] Appl. No.: 951,128

[22] Filed: Oct. 13, 1978

Related U.S. Application Data

[62] Division of Ser. No. 748,451, Dec. 8, 1976, Pat. No. 4,135,939.

[51] Int. Cl.$^2$ .............................................. C04B 37/00
[52] U.S. Cl. ....................................... 156/89; 106/68; 106/69
[58] Field of Search ....................... 156/89; 106/68, 69

[56] References Cited

U.S. PATENT DOCUMENTS

| | | | |
|---|---|---|---|
| 3,463,650 | 8/1969 | McCreight et al. | 106/69 |
| 3,757,274 | 8/1973 | Bahler | 106/68 |
| 3,770,867 | 11/1973 | Criss | 106/69 |

Primary Examiner—Patrick Garvin
Assistant Examiner—J. V. Howard
Attorney, Agent, or Firm—Fay & Sharpe

[57] ABSTRACT

A thermally stable refractory article and method of forming the same is provided. The refractory article comprises a mixture of fine and coarse silica sands containing from trace amounts up to about 10 weight percent alumina and a binder therefor. Preferably the fine silica sand has a particle size ranging from about 0.06 to about 0.10 mm while the coarse silica sand has a particle size of up to about 3.0 mm. The binder is a silica-alumina clay. Preferably it contains in weight percent from about 55 to about 60 percent silica and from about 22 to about 40 percent alumina, plus incidental impurities.

The invention also concerns the method of forming the above described refractory article and a monolithic lining therefrom.

4 Claims, No Drawings

REFRACTORY ARTICLE AND METHOD OF MAKING THE SAME

This is a division, of application Ser. No. 748,451, filed Dec. 8, 1976, now U.S. Pat. No. 4,135,939.

BACKGROUND OF THE INVENTION

1. Field of the Invention

The present invention concerns a unique unfired refractory article or brick capable of withstanding temperatures of up to 3,200° F. and above which is characterized by its resistance to thermal shock and general chemical inertness in a molten metal environment.

Broadly stated, the present invention relates to an improved unfired refractory brick which includes a mixture of fine silica sand particles having a particle size ranging from about 0.06 mm to about 1.0 mm and coarse silica sand particles having a particle size of up to about 3.0 mm which are bonded together by a clay binder.

2. Description of the Prior Art

It is well known to process or transport molten metals, particularly iron base metals, in vessels or receptacles which are lined with refractory materials. For example, in the handling or processing of pig iron it is common practice to line the receiving vessel or ladle with calcined fire-clay bricks which have an alumina content as high as 35 weight percent.

In general, the receiving vessel or ladle is usually provided with a refractory lining which consists of a plurality of individual bricks held in place by a suitable mortar. While this type of refractory brick performs well in most instances, it nevertheless suffers from certain inherent deficiencies. For example, often times the mortar is attacked by slag and/or the molten metal being processed. This causes the mortar to erode and results in the formation of so-called "cat-heads", i.e., the rounding of the surface of the brick in contact with the molten metal, on the individual bricks which make up the vessel lining. Ultimately, the molten metal permeates the spacing between juxtapositioned bricks and causes liner failure to occur.

In addition, most refractory brick used for the foregoing purpose tend to shrink when contacted by molten iron based metals. This causes the mortar to separate from the brick and permits molten metal to fill the so-formed void. In due course, this causes the lining to fail.

Accordingly, it is the principal object of the present invention to provide a means for overcoming the before discussed problems by providing a unique refractory brick.

Other objects of the invention will be apparent to those skilled in the art from a reading of the specification and claims.

SUMMARY OF THE INVENTION

In one aspect, the present invention broadly concerns a thermally stable refractory article composed of a mixture of special silica sands which are bonded together by a clay binder. In its preferred embodiment, it is composed of a mixture of from about 50 to about 70 weight percent fine silica sand having a particle size ranging from about 0.06 mm to about 0.10 mm; from about 10 to about 30 weight percent of a coarse silica sand having a particle size ranging from about 0.2 to about 3.0 mm; and from about 15 to about 30 weight percent of a clay binder.

In another aspect, the present invention concerns a method of forming a refractory article which is thermally stable at elevated temperatures comprising forming a mixture of special silica sands and clay; compacting this mixture into the desired shape; and subjecting the compacted article to a drying treatment whereby the moisture content of the so-formed article ranges, in weight percent, from about 1.5 to about 4.0 percent.

In still another aspect, the present invention concerns a method of forming a monolithic lining in a receptacle for receiving molten metal comprising providing a lining including a plurality of refractory articles composed of the above described materials, and heating the lining to a temperature sufficient to cause at least the surface of said refractory articles to become plastic thereby causing juxtapositioned refractory articles to become bonded together in a unitary manner.

Other features and aspects of the present invention will be clear to those skilled in the art from a reading of the specification and claims.

DESCRIPTION OF THE PREFERRED EMBODIMENTS OF THE INVENTION

Refractory articles, usually in brick form, produced according to the present invention are fabricated by forming a mixture of special silica sands and clay. Broadly, this mixture of sands is composed of the appropriate amount of both fine and coarse silica sands. The fine silica sand has a particle size ranging from about 0.06 mm to about 0.10 mm. The coarse sand has a particle size of up to about 3.0 mm. In the preferred embodiment, both forms of silica sand contain from a trace amount to about 10 weight percent alumina with the remainder being essentially silica ($SiO_2$) plus incidental impurities.

The preferred binder is a clay composed of from about 22 to about 40 weight percent alumina and from about 55 to about 60 weight percent silica, plus incidental impurities.

The refractory article of the invention is produced from a mixture composed of from about 50 to about 70 weight percent fine silica; from about 10 to about 30 weight percent coarse silica; and from about 15 to about 30 weight percent silica-alumina clay. The above ingredients are so selected that the chemical composition of the resultant article is from about 6 to about 9 weight percent alumina with the remainder being essentially silica plus incidental impurities.

In addition to the foregoing ingredients, the refractory article of the invention can have other materials added thereto to effect its properties and enhance its ability to withstand special conditions that it may experience in actual use. For example, chemical hardening agents such as sodium or other alkali metal phosphates, alumina phosphate, etc. may be added in varying percentages to increase the bonding and hardness of the fundamental refractory article. This results in an article which is ideal for use in slag zones or on the bottom of the ladle where molten metal has a high tendency to wear or wash away the article or brick.

The refractory article of the invention was primarily developed to cope with the severe environmental conditions found in iron and steel ladles. That is, the refractory article or brick must be able to withstand temperatures ranging up to about 3,200° F., sudden changes in temperature (thermal shock) and various stresses, usually compressive. In addition, it must be able to withstand the action of slags, ranging from acid to basic in character, and molten metals.

In the preferred embodiment of the invention the refractory article is in the form of a brick which is generally described as an unfired silica based brick intended for use in ladles for containing molten iron and steel. The brick of the invention is exceptionally dense, i.e., it has a high apparent density. In use, it is employed to line the interior surface and bottom of the ladle. When molten metal is introduced into the ladle, the surface of the lining (made from the unfired bricks without the use of any mortar) becomes monolithic. That is, because of the temperature of the molten metal the bricks expand thus closing the joints or spacing between them while concurrently the surfaces of the bricks become plastic and cause them to be bonded together. As a result of this monolithic condition, a lining is obtained which does not have joints for molten metal to penetrate or attack. Accordingly, the before discussed "cat-head" problem associated with conventional linings is avoided.

The refractory article of the invention is produced by forming a mixture of fine silica sand, coarse silica sand and a clay binder. The chemical composition, ranges of ingredients and physical characteristics of these individual components have been discussed hereinbefore and accordingly for the sake of brevity will not be discussed hereinafter in detail.

In the manufacture of the article of the invention, water and a temporary binder, for example waterglass, are added to the before described mixture. The water is added in an amount sufficient to insure that the raw mixture has a water content ranging from about 3.5 to about 6.0 weight percent. The resultant material is then formed into an article having the desired apparent density and configuration. In the fabrication of brick, the raw mix is compressed to a degree sufficient to cause the resultant article to have an apparent density of about 2.26 g/cc. Thereafter, the resultant article is either air dried or dried by the application of mild heat (heating at temperatures up to about 220° F. have been utilized successfully) so that the moisture content of the dried article ranges from about 1.5 weight percent on the surface to about 3 to 4 weight percent on the interior of the article.

Refractory brick produced according to the present invention, as before noted, are used to line the side walls and bottoms of ladles. These brick are put in place without the use of any mortar. When contacted by molten metal, the brick will first shrink slightly. This occurs at a temperature ranging from about 1,000° C. to about 1,300° C. The brick will then expand approximately 6–7 percent when heated at a temperature of about 1,500° C.–1,520° C. Above this temperature, the surface of the brick will become plastic. This plastic surface layer is very thin. However, it is adequate to cause juxtapositioned bricks to be bonded together to form a monolithic lining.

The following Example sets forth a typical means of fabricating the refractory articles of the invention.

EXAMPLE

About 1,300 pounds of a raw mixture consisting of, in weight percent, about 60 percent fine silica sand having an average particle size ranging from about 0.06 to about 0.10 mm, 20 percent coarse silica sand having an average particle size ranging from about 0.2 mm up to about 3.0 mm, and 20 percent silica-alumina clay were mixed together in a conventional blending apparatus.

Both the fine and coarse silica sands had the same chemical composition, about 90 to about 91 weight percent silica and from about 1.2 to about 5.0 weight percent alumina plus incidental impurities.

The binder material, i.e., the clay was composed of about 57.0 weight percent silica and about 28.5 weight percent alumina, plus various impurities.

Water and a temporary binder (waterglass) were then added to the raw mix in such a fashion that the moisture content thereof was about 8.0 weight percent. A plurality of bricks about 8.0 by 10.0 by 3.0 inches were then formed from this wet mix. The apparent density of the so-produced bricks was about 2.26 g/cc. The bricks were then dried at a temperature of about 200° F. The moisture content of the dried bricks ranged from about 1.5 weight percent on the surface to about 3–4 weight percent in the center.

The chemical composition of the resultant brick (both sand plus binder) was about 6.5 weight percent alumina with the remainder being essentially silica plus incidental impurities.

About 700 bricks produced as described above were used to line the bottom of a ladle. These bricks were put in position without the use of any mortar. About 250 tons of molten iron was poured into the ladle to cause the bricks to fuse together to form a monolithic lining. Subsequently, about 350 more heats of molten iron were poured into the ladle before any significant deterioration in the lining was observed.

By way of contrast, when conventional fire-clay bricks were used to line the same size and type of ladle significant deterioration was noticed after 200 heats of molten iron were were poured.

Fron the foregoing, it is clear that a new and superior refractory article or brick has been provided which exhibits desirable properties not found in prior art refractory bricks.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A method of forming a monolithic lining in a receptacle for receiving molten metal comprising:
    providing a lining including a plurality of refractory articles composed of from about 50 to about 70 weight percent fine silica sand particles, said fine silica sand particles having an average particle size ranging from about 0.06 to about 0.10 mm.; from about 10 to about 30 weight percent coarse silica sand particles, said coarse silica sand particles having a maximum particle size of about 3.0 mm.; and from about 15 to about 30 weight percent of an alumina containing clay binder, with the total content of alumina in said unfired article ranging from about 6.0 to about 9.0 weight percent; and
    heating said lining to a temperature sufficient to cause at least the surface of said refractory articles to become plastic so as to bond juxtaposition refractory articles together.

2. The method of claim 1 wherein said clay binder consists essentially of a mixture of silica and alumina.

3. The method of claim 2 wherein said binder, in weight percent, is composed of from about 55 to about 60 percent silica and from about 22 to about 40 percent alumina plus incidental impurities.

4. The method of claim 1 wherein said fine silica sand particles are present, in weight percent, in an amount of about 60 percent; said coarse silica sand particles are present, in weight percent, in an amount of about 20 percent; and said clay is present, in an amount of about 20 percent.

* * * * *